(12) United States Patent
Arnitz et al.

(10) Patent No.: US 10,916,974 B2
(45) Date of Patent: Feb. 9, 2021

(54) WIRELESS POWER RECEIVERS THAT RECEIVE POWER DURING TRAVERSAL OF A PRESCRIBED PATH

(71) Applicant: Searete LLC, Bellevue, WA (US)

(72) Inventors: Daniel Arnitz, Seattle, WA (US); Lawrence F. Arnstein, Seattle, WA (US); Joseph Hagerty, Seattle, WA (US); Guy S. Lipworth, Seattle, WA (US)

(73) Assignee: The Invention Science Fund I LLC, Bellevue, WA (US)

( * ) Notice: Subject to any disclaimer, the term of this patent is extended or adjusted under 35 U.S.C. 154(b) by 98 days.

(21) Appl. No.: 16/142,750

(22) Filed: Sep. 26, 2018

(65) Prior Publication Data
US 2020/0099258 A1 Mar. 26, 2020

(51) Int. Cl.
| | | |
|---|---|---|
| *H02J 7/00* | (2006.01) | |
| *H02J 50/90* | (2016.01) | |
| *H02J 50/27* | (2016.01) | |
| *H01Q 21/28* | (2006.01) | |
| *H02J 50/80* | (2016.01) | |
| *H02J 50/40* | (2016.01) | |

(52) U.S. Cl.
CPC ............ *H02J 50/90* (2016.02); *H01Q 21/28* (2013.01); *H02J 7/007* (2013.01); *H02J 50/27* (2016.02); *H02J 50/40* (2016.02); *H02J 50/80* (2016.02)

(58) Field of Classification Search
CPC .. H02J 50/20; H02J 50/90; H02J 50/80; H02J 50/27; H02J 50/40; H02J 7/007; H01Q 21/28

USPC .......................................................... 320/107
See application file for complete search history.

(56) References Cited

U.S. PATENT DOCUMENTS

| | | | | |
|---|---|---|---|---|
| 2010/0315045 | A1* | 12/2010 | Zeine | H02J 7/025 320/137 |
| 2014/0354036 | A1* | 12/2014 | Koo | B60T 13/686 303/6.01 |
| 2017/0077736 | A1* | 3/2017 | Leabman | G06K 9/52 |
| 2018/0323657 | A1* | 11/2018 | Hannigan | H02J 50/23 |
| 2019/0074881 | A1 | 3/2019 | Urzhumov | |
| 2019/0356177 | A1* | 11/2019 | Swan | H02J 50/80 |

(Continued)

OTHER PUBLICATIONS

Non-Final Rejection for U.S. Appl. No. 16/142,764, dated Apr. 7, 2020, pp. 1-9.

(Continued)

*Primary Examiner* — Suresh Memula

(57) ABSTRACT

According to various embodiments, a moving wireless power receiver is configured to receive power wirelessly based on a prescribed path of the wireless power receiver. A prescribed path that a moving wireless power receiver traverses is identified. Further, at least one element of the wireless power receiver is controlled based on the prescribed path to change an amount of power received at the wireless power receiver from incident power transmitted by one or more wireless power transmitters. Specifically, the at least one element can be controlled to change the amount of power received at the wireless power receiver as either or both a posture and a position of the wireless power receiver change with respect to the one or more wireless power transmitters as the wireless power receiver traverses the prescribed path.

39 Claims, 6 Drawing Sheets

(56) References Cited

U.S. PATENT DOCUMENTS

2020/0028384 A1* 1/2020 Murata ................ H02J 50/40
2020/0044482 A1* 2/2020 Partovi ................ H02J 50/80

OTHER PUBLICATIONS

Final Rejection for U.S. Appl. No. 16/142,764, dated Jun. 24, 2020, pp. 1-10.

* cited by examiner

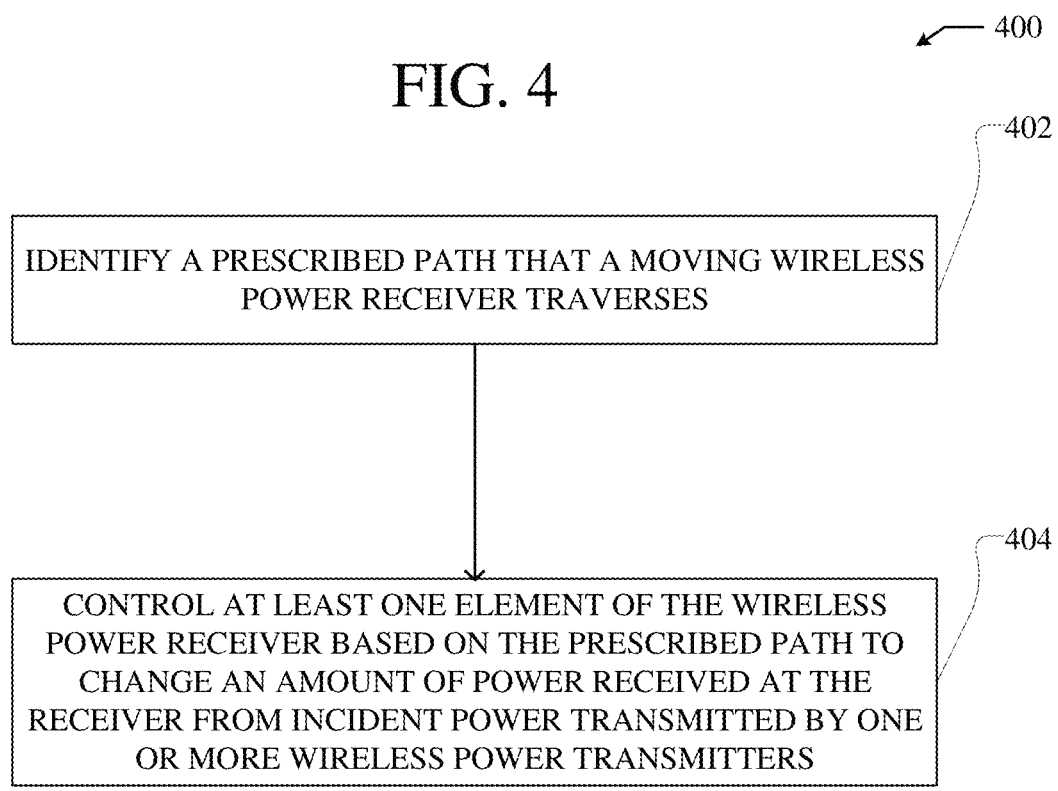

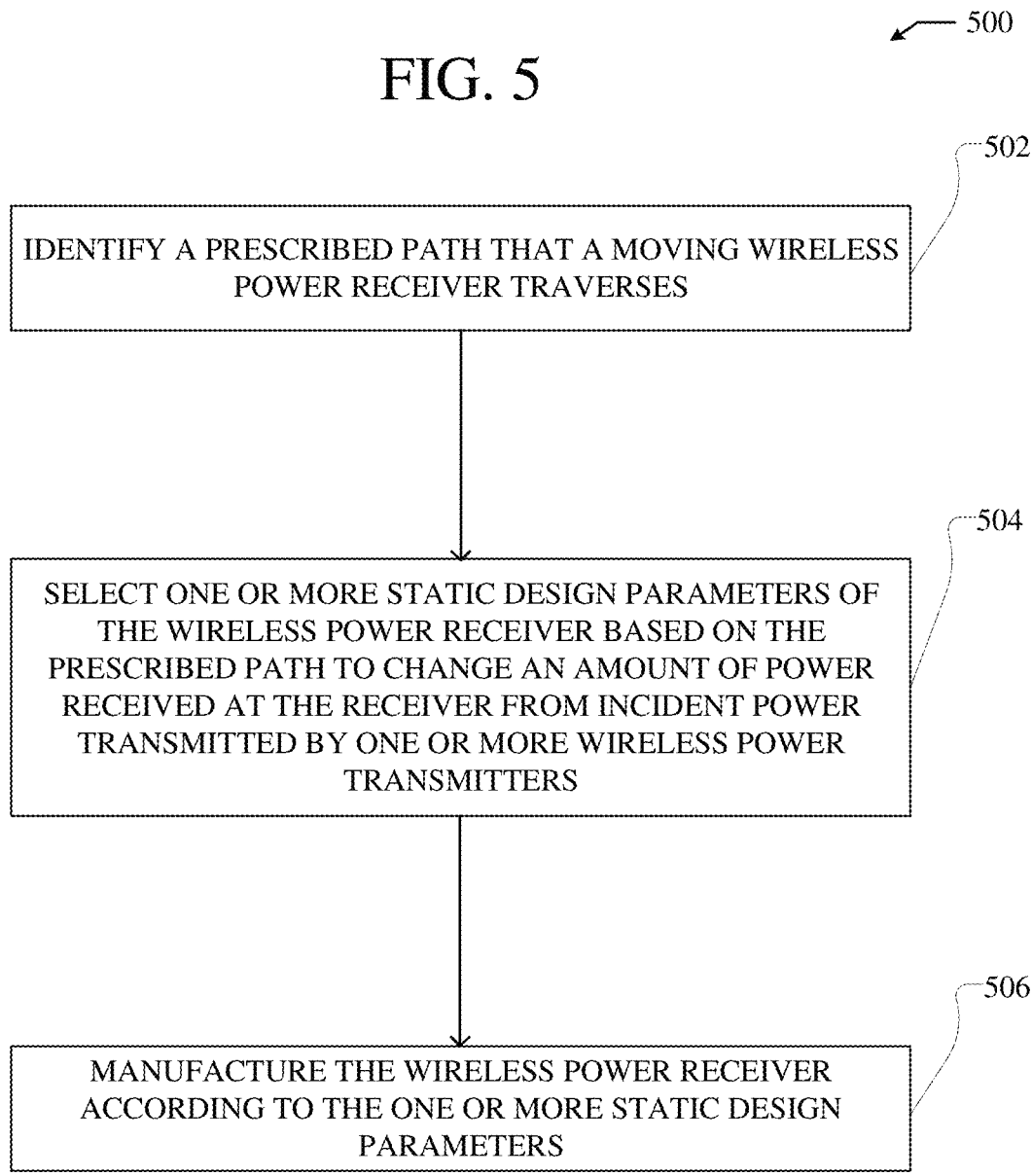

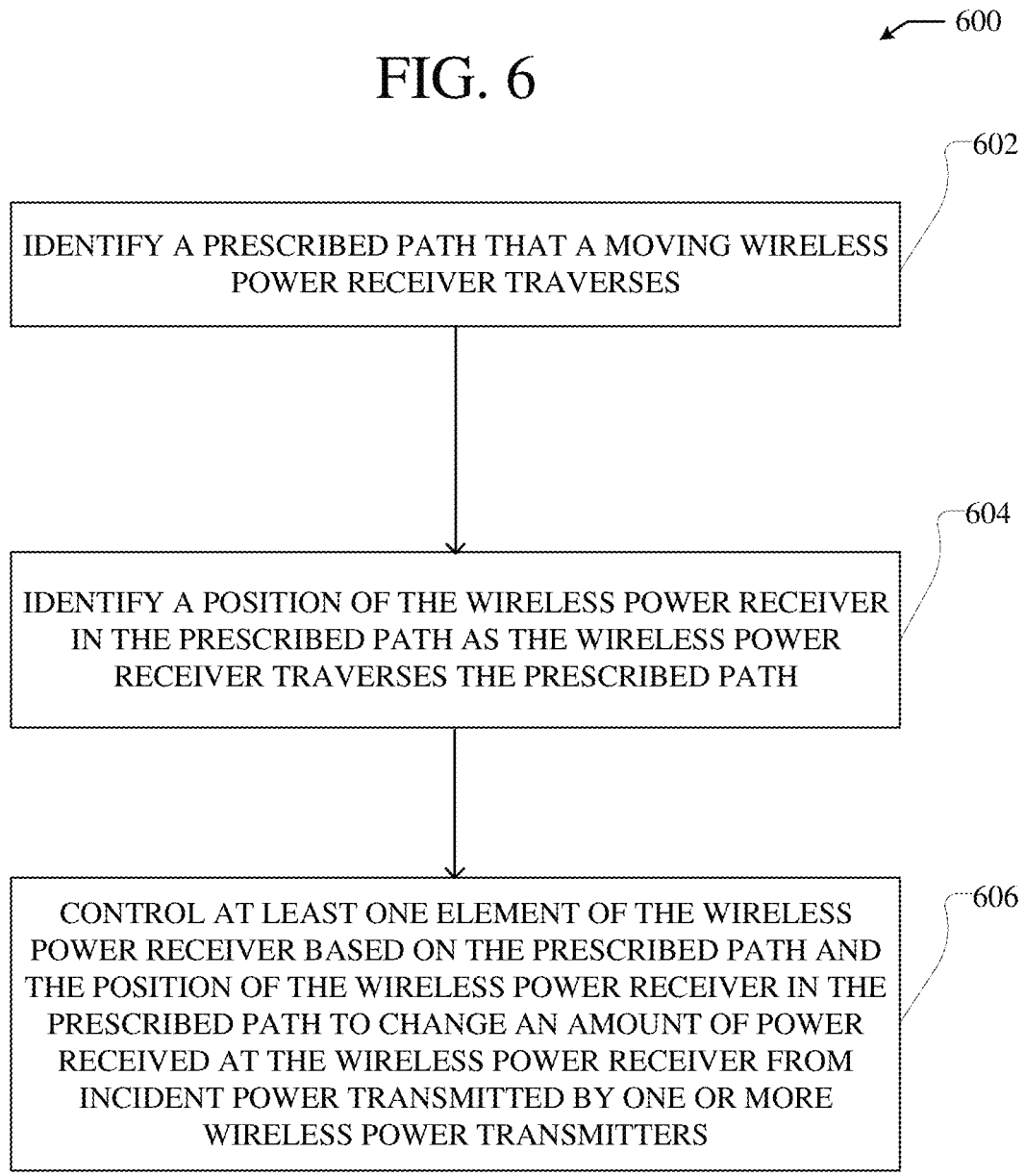

WIRELESS POWER RECEIVERS THAT RECEIVE POWER DURING TRAVERSAL OF A PRESCRIBED PATH

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application. All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

TECHNICAL FIELD

This disclosure relates to controlling an amount of power transmitted to a wireless power receiver. Specifically, this disclosure relates to controlling at least one element of a wireless power receiver to change an amount of wireless power received at the wireless power receiver as the wireless power receiver traverses a prescribed path.

SUMMARY

According to various embodiments, a prescribed path that a moving wireless power receiver traverses is identified. At least one element of the wireless power can be controlled based on the prescribed path to change an amount of power received at the wireless power receiver from incident power transmitted by one or more wireless power transmitters. Specifically, the at least one element can be controlled to change the amount of power received at the wireless power receiver as either or both a posture and a position of the wireless power receiver change with respect to the one or more wireless power transmitters as the wireless power receiver traverses the prescribed path.

In various embodiments, a wireless power receiver for movement along a prescribed path comprises at least one element that is controllable based on the prescribed path to change an amount of power received at the wireless power receiver from incident power transmitted by one or more wireless power transmitters. Specifically, the at least one element is controllable to change the amount of power received at the wireless power receiver as either or both a posture and a position of the wireless power receiver change with respect to the one or more wireless power transmitters as the wireless power receiver traverses the prescribed path.

In certain embodiments, a prescribed path that a moving wireless power receiver traverses is identified. One or more static design parameters of the wireless power receiver can be selected based on the prescribed path to change an amount of power received at the wireless power receiver from incident power transmitted by one or more wireless transmitters. Specifically, the one or more static design parameters can be selected to change the amount of power received at the wireless power receiver as either or both a posture and a position of the wireless power receiver change with respect to the one or more wireless power transmitters as the wireless power receiver traverses the prescribed path. The wireless power receiver can be manufactured according to the one or more static design parameters.

In various embodiments, a wireless power receiver for movement along a prescribed path comprises at least one element manufactured according to one or more static design parameters of the wireless power receiver. The one or more static design parameters can be selected based on the prescribed path to change an amount of power received at the wireless power receiver from incident power transmitted by one or more wireless power transmitters. Specifically, the one or more static design parameters can be selected to change the amount of power received at the wireless power receiver as either or both a posture and a position of the wireless power receiver change with respect to the one or more wireless power transmitters as the wireless power receiver traverses the prescribed path.

In certain embodiments, a prescribed path that a moving wireless power receiver traverses is identified. A position of the wireless power receiver in the prescribed path can be identified as the wireless power receiver traverses the prescribed path. At least one element of the wireless power receiver can be controlled based on the prescribed path and the position of the wireless power receiver in the prescribed path to change an amount of power received at the wireless power receiver from incident power transmitted by one or more wireless power transmitters. Specifically, the at least one element of the wireless power receiver can be controlled to change the amount of power received at the wireless power receiver as either or both a posture and a position of the wireless power receiver change with respect to the one or more wireless power transmitters as the wireless power receiver traverses the prescribed path.

In various embodiments, a wireless power receiver for movement along a prescribed path includes at least one element that is controllable based on the prescribed path and the position of the wireless power receiver along the prescribed path to change an amount of power received at the wireless power receiver. Specifically, the at least one element can be controlled to change the amount of power received at the wireless power receiver as either or both a posture and a position of the wireless power receiver change with respect to the one or more wireless power transmitters as the wireless power receiver traverses the prescribed path.

BRIEF DESCRIPTION OF THE DRAWINGS

FIG. 4 is a flowchart of an example method of controlling elements of a wireless power receiver based on a prescribed path to change an amount of power received by the receiver during traversal of the prescribed path.

FIG. 5 is a flowchart of an example method of manufacturing a wireless power receiver based on a prescribed path to change an amount of power received by the receiver during traversal of the prescribed path.

FIG. 6 is a flowchart of an example method of controlling elements of a wireless power receiver based on a prescribed path and a position of the receiver in the prescribed path to change an amount of power received by the receiver during traversal of the prescribed path.

DETAILED DESCRIPTION

Figure 1:
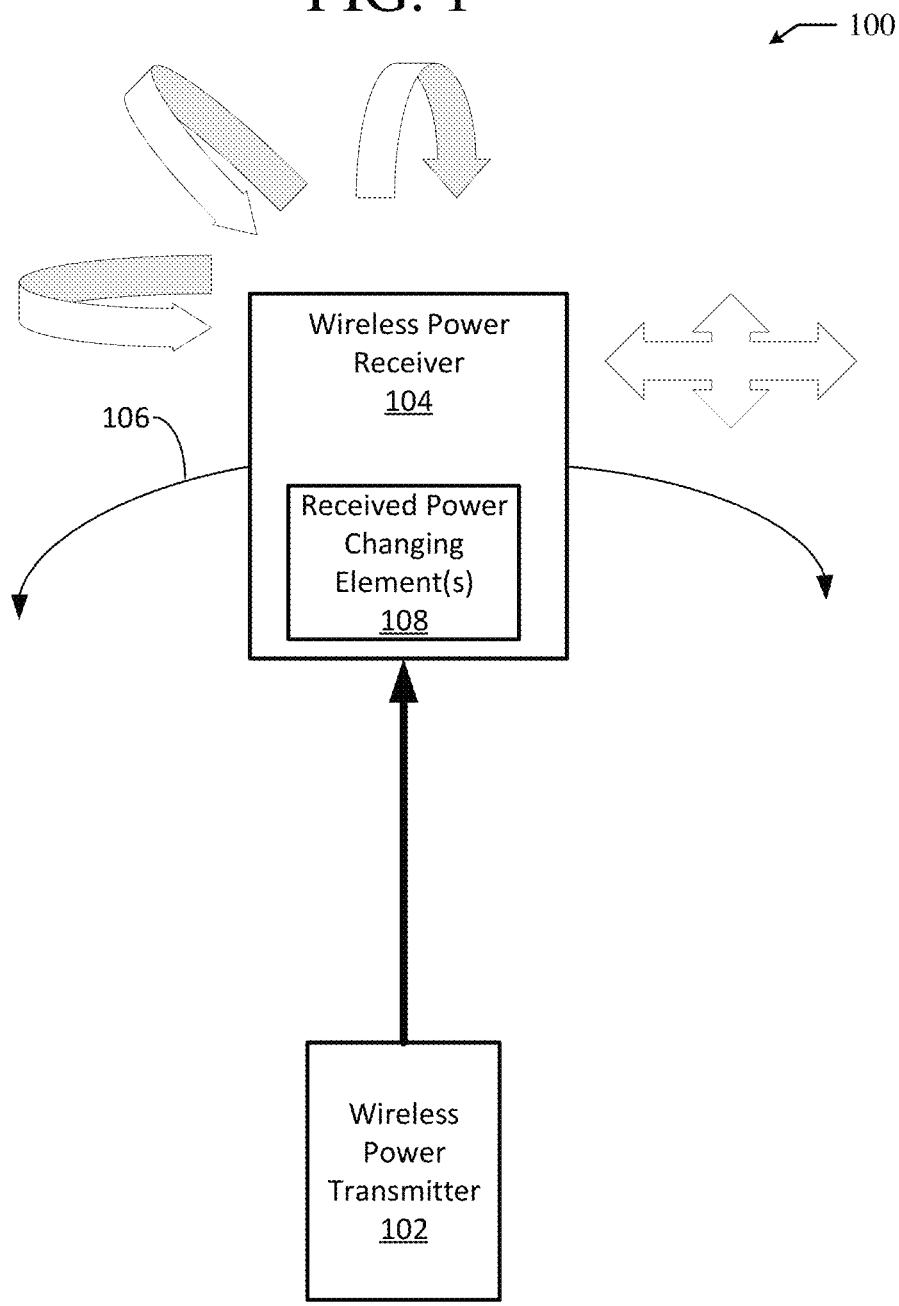
FIG. 1 illustrates an example system for delivering and receiving wireless power.

According to various embodiments, a prescribed path that a moving wireless power receiver traverses is identified. At least one element of the wireless power can be controlled based on the prescribed path to change an amount of power received at the wireless power receiver from incident power transmitted by one or more wireless power transmitters. Specifically, the at least one element can be controlled to change the amount of power received at the wireless power receiver as either or both a posture and a position of the wireless power receiver change with respect to the one or more wireless power transmitters as the wireless power receiver traverses the prescribed path.

In various embodiments, a wireless power receiver for movement along a prescribed path comprises at least one element that is controllable based on the prescribed path to change an amount of power received at the wireless power receiver from incident power transmitted by one or more wireless power transmitters. Specifically, the at least one element is controllable to change the amount of power received at the wireless power receiver as either or both a posture and a position of the wireless power receiver change with respect to the one or more wireless power transmitters as the wireless power receiver traverses the prescribed path.

In certain embodiments, a prescribed path that a moving wireless power receiver traverses is identified. One or more static design parameters of the wireless power receiver can be selected based on the prescribed path to change an amount of power received at the wireless power receiver from incident power transmitted by one or more wireless transmitters. Specifically, the one or more static design parameters can be selected to change the amount of power received at the wireless power receiver as either or both a posture and a position of the wireless power receiver change with respect to the one or more wireless power transmitters as the wireless power receiver traverses the prescribed path. The wireless power receiver can be manufactured according to the one or more static design parameters.

In various embodiments, a wireless power receiver for movement along a prescribed path comprises at least one element manufactured according to one or more static design parameters of the wireless power receiver. The one or more static design parameters can be selected based on the prescribed path to change an amount of power received at the wireless power receiver from incident power transmitted by one or more wireless power transmitters. Specifically, the one or more static design parameters can be selected to change the amount of power received at the wireless power receiver as either or both a posture and a position of the wireless power receiver change with respect to the one or more wireless power transmitters as the wireless power receiver traverses the prescribed path.

In certain embodiments, a prescribed path that a moving wireless power receiver traverses is identified. A position of the wireless power receiver in the prescribed path can be identified as the wireless power receiver traverses the prescribed path. At least one element of the wireless power receiver can be controlled based on the prescribed path and the position of the wireless power receiver in the prescribed path to change an amount of power received at the wireless power receiver from incident power transmitted by one or more wireless power transmitters. Specifically, the at least one element of the wireless power receiver can be controlled to change the amount of power received at the wireless power receiver as either or both a posture and a position of the wireless power receiver change with respect to the one or more wireless power transmitters as the wireless power receiver traverses the prescribed path.

In various embodiments, a wireless power receiver for movement along a prescribed path includes at least one element that is controllable based on the prescribed path and the position of the wireless power receiver along the pre-scribed path to change an amount of power received at the wireless power receiver. Specifically, the at least one element can be controlled to change the amount of power received at the wireless power receiver as either or both a posture and a position of the wireless power receiver change with respect to the one or more wireless power transmitters as the wireless power receiver traverses the prescribed path.

The example wireless power receivers described herein can be configured to wirelessly receive power using RF signals. Specifically, the wireless power receivers can generate power from received RF energy as part of wirelessly receiving power using the RF signals. More specifically, the wireless power receivers can generate, from received RF energy, direct current voltage to power devices coupled to or incorporating the wireless power receivers.

In receiving RF energy as part of receiving wirelessly transferred power, the wireless power receivers described herein can receive RF energy as part of a steerable beam of RF energy, e.g. as part of an energy carrying signal at a specific RF frequency or within a specific RF frequency band. Specifically, received RF energy can be transmitted using a phased array of antennas. A beam of RF energy used to transmit RF energy to the wireless power receivers described herein can be steered based on a position of the wireless power receivers. More specifically, a wireless power receiver can move and a beam of RF energy can be steered towards the wireless power receiver as it moves.

Some of the infrastructure that can be used with embodiments disclosed herein is already available, such as general-purpose computers, antennas, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates an example system 100 for delivering and receiving wireless power. The system 100 includes a wireless power transmitter 102 and a wireless power receiver 104. The wireless power transmitter 102 functions according to an applicable device for wirelessly transmitting power, such as the wireless power transmitters described herein. Specifically, the wireless power transmitter 102 can transmit power through a beam of energy, e.g. RF energy. Further, the wireless power transmitter 102 can transmit power through a steerable beam of RF energy, e.g. as part of an energy carrying signal at a specific RF frequency or within a specific RF frequency band. Specifically, the wireless power transmitter can transmit RF energy in a steerable beam using a phased array of antennas. While only a single wireless power transmitter 102 is shown in FIG. 1, in various embodiments, the system 100 can include multiple wireless power transmitters. Specifically, the system 100 can include multiple wireless power transmitters configured to wirelessly transfer power to the wireless power receiver, potentially simultaneously.

The wireless power receiver 104 functions to receive power wirelessly from the wireless power transmitter 102. The wireless power receiver 104 can move as it receives wireless power. Specifically, the wireless power receiver 104 can be configured to move itself or integrated as part of a moveable device for moving the wireless power receiver 104 as the wireless power receiver 104 receives wireless power. The wireless power receiver 104 can move terrestrially. For example, the wireless power receiver 104 can be integrated as part of a land vehicle for movement along land. Further, the wireless power receiver 104 can move aerially. For example, the wireless power receiver 104 can be a drone that is configured to fly through the air.

The wireless power receiver 104 can move along a prescribed path 106. A prescribed path, as used herein, can include a predefined path or route that is known before a wireless power receiver traverses all or a portion of the path. For example, a portion of a prescribed path can include a 45° turn twenty feet from the beginning of the path, which is known before a wireless power receiver makes the turn in traversing the prescribed path. While the prescribed path 106 shown in FIG. 1 is curved, in various embodiments, the prescribed path 106 can be straight or include an applicable number of curved and straight portions. A prescribed path can be represented along one dimension in three-dimensional Euclidian space, along two dimensions in three-dimensional Euclidian space, or along three dimensions in three-dimensional Euclidian space.

The wireless power receiver 104 can traverse the prescribed path 106 a single time. Alternatively, the wireless power receiver 104 can traverse the prescribed path 106 multiple times, e.g. continuously traverse the prescribed path 106. For example, the prescribed path 106 can be an open path with a starting point and an end point and the wireless power receiver 104 can move back and forth between the starting point and the end point. Further in the example, the wireless power receiver 104 can switch path directions as it moves back and forth between the starting point and the end point in traversing the prescribed path 106. In another example, the prescribed path 106 can be a closed loop and the wireless power receiver 104 can continuously traverse the prescribed path 106 by moving along the closed loop, e.g. in the same path direction.

As the wireless power receiver 104 traverses the prescribed path 106, a position of the wireless power receiver 104 with respect to the wireless power transmitter 102 can change. For example, the wireless power receiver 104 can move from twenty feet away from the wireless power transmitter 102 to forty feet away from the wireless power transmitter 102 as the wireless power receiver 104 traverses the prescribed path 106. Further, as the wireless power receiver 104 traverses the prescribed path 106, a position of the wireless power receiver 104 with respect to the prescribed path 106 can change. For example, as the wireless power receiver 104 traverses the prescribed path 106, the wireless power receiver 104 can move four feet out of the prescribed path 106.

Additionally, as the wireless power receiver 104 traverses the prescribed path 106, a posture of the wireless power receiver 104 can change. A posture of the wireless power receiver 104 can include an orientation of the wireless power receiver 104 with respect to a reference point or location, e.g. as part of the prescribed path 106. Specifically, a posture of the wireless power receiver 104 can be defined according to one or a combination of a changing roll, pitch, and/or yaw of the wireless power receiver 104 about one or more axes of the wireless power receiver 104. For example, a posture of the wireless power receiver 104 can change as the wireless power receiver rotates 45° about a primary axis, e.g. from back to front, of the wireless power receiver 104.

A posture of the wireless power receiver 104 can change with respect to the wireless power transmitter 102 as the wireless power receiver 104 traverses the prescribed path 106. For example, as the wireless power receiver 104 traverses the prescribed path 106, a pitch of the wireless power receiver 104 can change by 20° to change a posture of the wireless power receiver 104 with respect to the wireless power transmitter 102. Further a posture of the wireless power receiver 104 can change with respect to the prescribed path 106 as the wireless power receiver 104 traverses the prescribed path 106. For example, as the wireless power receiver 104 traverses the prescribed path 106, a yaw of the wireless power receiver can change by 30° to change a posture of the wireless power receiver 104 with respect to the prescribed path 106.

The wireless power receiver 104 includes one or more received power changing elements 108. The received power changing elements 108 are configured to change an amount of power received at the wireless power receiver 104 from incident power transmitted by the wireless power transmitter 102. Specifically, the received power changing elements 108 can change the amount of power received at the wireless power receiver 104 as the wireless power receiver traverses the prescribed path 106. More specifically, the received power changing elements 108 can change the amount of power received at the wireless power receiver 104 as either or both a position and a posture of the wireless power receiver 104 change as the wireless power receiver 104 traverses the prescribed path 106. For example, the received power changing elements 108 can change an amount of power received at the wireless power receiver 104 as either or both a position and a posture of the wireless power receiver 104 with respect to the wireless power transmitter 102 change. In another example, the received power changing elements 108 can change an amount of power received at the wireless power receiver 104 as either or both a position and a posture of the wireless power receiver 104 with respect to the prescribed path 106 change.

The received power changing elements 108 can be static elements that are uncontrollable during operation of the wireless power receiver 104. Static elements can include elements having either or both physical and electrical characteristics that remain unchanged during the operation of the wireless power receiver 104. For example, a static element can include a housing included as part of the wireless power receiver 104. As will be discussed in greater detail later, a static element can be selected, designed, and integrated as part of the wireless power receiver 104 to change the amount of power received at the wireless power receiver 104 from incident power transmitted by the wireless power transmitter 102 as the wireless power receiver 104 traverses the prescribed path 106. More specifically, a static element can be selected and designed to change the amount of power received at the wireless power receiver 104 while either or both physical and electrical characteristics of the static element remain unchanged during operation of the wireless power receiver 104.

Further, the received power changing elements 108 can be controllable to change an amount of power received at the wireless power receiver 104 from incident power transmitted by the wireless power transmitter 102. Specifically, the received power changing elements 108 can be controlled as either or both a posture and a position of the wireless power receiver are varied in order to change an amount of power wirelessly received at the wireless power receiver 104. More specifically, the received power changing elements 108 can be controlled as either or both a posture of the wireless power receiver 104 change with respect to the wireless power transmitter 102 to change the amount of power received at the wireless power receiver 104. For example, as a current position of the wireless power receiver 104 changes from an original reference position, a displacement mechanism for moving the wireless power receiver 104, e.g. as included as part of the elements 108, can be controlled to move the wireless power transmitter 102 back towards its original reference position. In turn, moving the wireless power transmitter to its original reference position can change the amount of power wirelessly received at the wireless power receiver 104 from incident power transmitted by the wireless power transmitter 102.

The received power changing elements 108 can be controlled based on the prescribed path 106 to change an amount of power received at the wireless power receiver 104 from incident power transmitted by the wireless power transmitter 102. Specifically, the received power changing elements 108 can be controlled based on the prescribed path 106 as either or both a position and a posture of the wireless power receiver 104 change as the wireless power receiver 104 traverses the prescribed path 105. More specifically, the received power changing elements 108 can be controlled based on the prescribed path 106 as either or both the position and the posture of the wireless power receiver 104 with respect to the wireless power transmitter 102 change as the wireless power receiver 104 traverses the prescribed path 106. For example, an antenna of the wireless power receiver 104 can begin to tilt away from the wireless power transmitter 102 as the wireless power receiver 104 traverses the prescribed path 106. Further in the example, one or more tilt control mechanisms, e.g. received power changing elements 108, can be activated to tilt the antenna of the wireless power receiver 104 back towards the wireless power transmitter 102. In turn, this can change the amount of power wirelessly received at the wireless power receiver 104 from incident power transmitted as the wireless power receiver 104 traverses the prescribed path 106.

In controlling the received power changing elements 108 based on the prescribed path 106, the received power changing elements 108 can be controlled based on a predefined route of the prescribed path 106 known before the wireless power receiver traverses the prescribed path 106. Specifically, either or both anticipated positions and anticipated postures that the wireless power receiver 104 will achieve as it traverses the prescribed path 106 can be identified based on the predefined route of the prescribed path 106. Accordingly, the received power changing elements 108 of the wireless power receiver 104 can be controlled based on either or both the anticipated positions and the anticipated postures in order to change an amount of power received at the wireless power receiver 104 as the wireless power receiver 104 traverses the predefined route of the prescribed path 106. For example, it can be anticipated, from a predefined route of the prescribed path 106, that the wireless power receiver 104 will tilt away from the wireless power transmitter 102 ten seconds after beginning traversal of the prescribed path 106. Further in the example, based on this anticipated posture of the wireless power receiver 104, one or more tilt control mechanisms, e.g. the received power changing elements 108, can be activated after the wireless power receiver 104 begins traversing the prescribed path 106 to counteract the anticipated tilt. In turn, this can change the amount of power received at the wireless power receiver 104 from incident power transmitted by the wireless power transmitter 102 as the wireless power receiver 104 traverses the prescribed path 106.

Further, in controlling the received power changing elements 108 based on the prescribed path 106, the received power changing elements 108 can be controlled based on a position of the wireless power receiver 104 in the prescribed path 106 as the wireless power receiver traverses the prescribed path 106. Specifically, as discussed previously, an anticipated position or anticipated posture of the wireless power receiver 104 with respect to the wireless power transmitter 102 can be identified based on a predefined route of the prescribed path 106. The anticipated position or posture can correspond to a position of the wireless power transmitter 102 in the prescribed path 106 as the wireless power receiver traverses the prescribed path 106. For example, it can be anticipated, based on the predefined route of the prescribed path 106, that the wireless power receiver 104 will tilt 30° with respect to the wireless power transmitter 102 half way through traversing the entire prescribed path 106, e.g. a position of the wireless power receiver 104 in the prescribed path 106. Accordingly, the received power changing elements 108 can be controlled when the wireless power receiver 104 is halfway through traversing the prescribed path 106, e.g. based on a position of the wireless power receiver 104 in the prescribed path 106, to correct the anticipated tilt of the wireless power receiver 104.

The received power changing elements 108 can be controlled to change an amount of power received at the wireless power receiver 104 with respect to one or more specific amounts of power. Specifically, the received power changing elements 108 of the wireless power receiver 104 can be controlled to maintain an amount of power received at the wireless power receiver 104 above a specific threshold amount of power. Alternatively, the received power changing elements 108 of the wireless power receiver 104 can be controlled to maintain an amount of power received at the wireless power receiver 104 within a specific range of amounts of power.

Further, the received power changing elements 108 can be controlled based on an identified target effective aperture for the wireless power receiver 104. Specifically, the received power changing elements 108 can be controlled based on an identified target effective aperture of the wireless power receiver 104 with respect to the wireless power transmitter 102 as the wireless power receiver 104 traverses at least a portion of the prescribed path 106. A target effective aperture for the wireless power receiver 104 can include an area of one or more antennas of the wireless power receiver 104 orientated perpendicular to incident power that can intercept the same amount of the incident power as if the incident power was produced by the one or more antennas. For example, if a target effective aperture of the wireless power receiver 104 is 1 m$^2$, then a position control mechanisms and/or a posture control mechanisms can be controlled to ensure that an effective aperture of the wireless power receiver 104 remains at or above 1 m$^2$ as the wireless power receiver 104 traverses the prescribed path 106.

Figure 2:
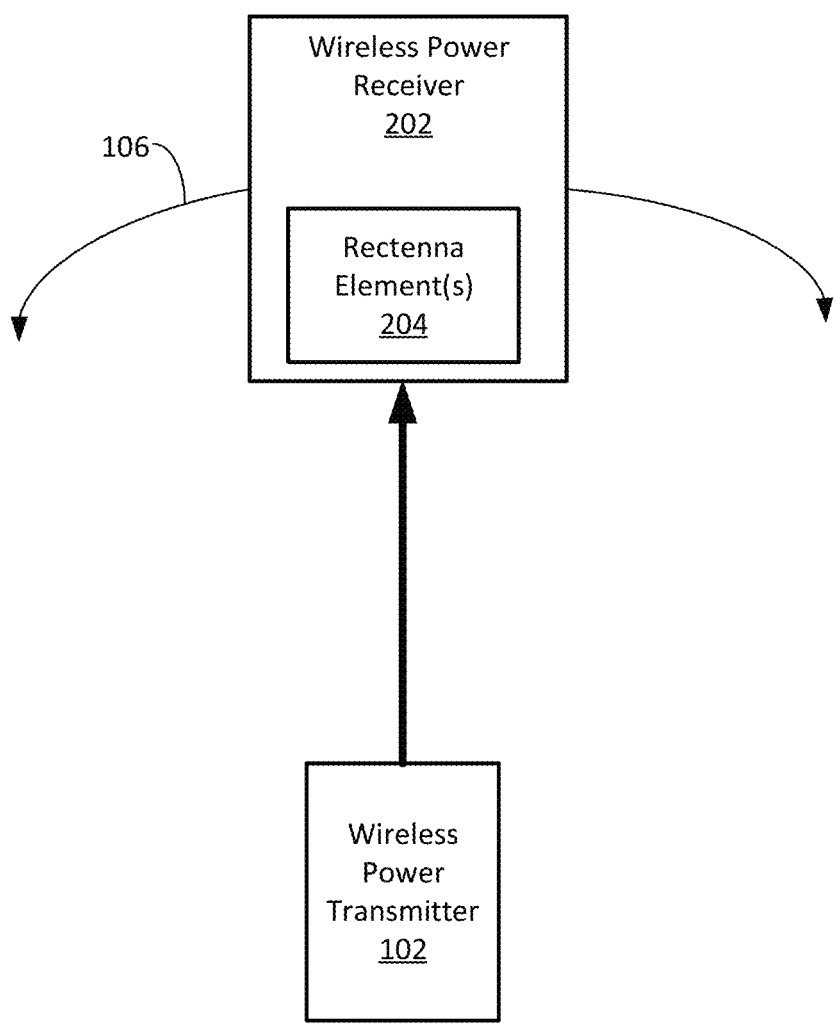
FIG. 2 illustrates an example system for delivering and receiving wireless power to change an amount of wireless power received from incident power using rectenna elements.

FIG. 2 illustrates an example system 200 for delivering and receiving wireless power to change an amount of wireless power received from incident power using rectenna elements. The example system 200 shown in FIG. 2 includes a wireless power receiver 202 and the wireless power transmitter 102. The wireless power receiver 202 can receive power wirelessly from incident wireless power transmitted by the wireless power transmitter 102. More specifically, the wireless power receiver 202 can receive power from incident wireless power transmitted by the wireless power transmitter 102 as the wireless power receiver 202 traverses the prescribed path 106.

The wireless power receiver 202 can move terrestrially as it traverses the prescribed path 106. For example, the wireless power receiver 202 can be integrated as part of a land vehicle for movement along land. Further, the wireless power receiver 202 can move aerially as it traverses the prescribed path. For example, the wireless power receiver 202 can be integrated as part of a drone that is configured to fly through the air.

The wireless power receiver 202 includes one or more rectenna elements 204. The rectenna elements 204 can be included as part of the received power changing elements 108 of the wireless power receiver 104 discussed in the example system 100 shown in FIG. 1. Specifically, the rectenna elements 204 can change an amount of power received at the wireless power receiver from incident power transmitted by the wireless power transmitter 102 as the wireless power receiver traverses the prescribed path 106. More specifically, the rectenna elements 204 can change an amount of power received at the wireless power receiver 202 as either or both a posture and a position of the wireless power receiver 202 change as the wireless power receiver traverses the prescribed path 106.

The rectenna elements 204 function to receive power at the wireless power receiver 202 from incident power, e.g. incident at the wireless power receiver 202, transmitted by the wireless power transmitter 102. The rectenna elements 204 include one or more antennas and one or more rectifiers. The one or more antennas of the rectenna elements 204 can receive electromagnetic energy/power from incident power transmitted by the wireless power transmitter 102 while the one or more rectifiers rectify the electromagnetic energy/power received by the one or more antennas, e.g. produce DC power from the power received by the one or more antennas. Subsequently, power received by the rectenna elements 204 can be used to power the wireless power receiver 202. Further power received by the rectenna elements 204 can be used to power peripheral components or systems coupled to the wireless power receiver.

The rectenna elements 204 can be electrically steered. Specifically, the rectenna elements 204 can be electrically steered as part of controlling the rectenna elements 204 to change the amount of power received at the wireless power receiver 202 from incident power transmitted by the wireless power transmitter 102 as the wireless power receiver 202 traverses the prescribed path 106. More specifically, the rectenna elements 204 can be electrically steered to change the amount of power received at the wireless power receiver 202 as either or both a position and a posture of the wireless power receiver 202, with respect to either or both the prescribed path 106 and the wireless power transmitter 102, change as the wireless power receiver 202 traverses the prescribed path 106. As part of electrically steering the rectenna elements 204, one or more electrical parameters of the rectenna elements 204 can be adjusted to electrically steer the rectenna elements 204. For example, a phase of one or more antennas of the rectenna elements 204 can be adjusted to electrically steer the rectenna elements 204. In another example, impedances of the rectenna elements 204 can be adjusted to electrically steer the rectenna elements 204.

The rectenna elements 204 can be physically steered. Specifically, the rectenna elements 204 can be physically steered as part of controlling the rectenna elements 204 to change the amount of power that is received at the wireless power receiver 202 from incident power transmitted by the wireless power transmitter 102 as the wireless power receiver 202 traverses the prescribed path 106. More specifically, the rectenna elements 204 can be physically steered to change the amount of power that is received at the wireless power receiver 202 as either or both a position and a posture of the wireless power receiver 202 with respect to either or both the prescribed path 106 and the wireless power transmitter 102 change as the wireless power receiver 202 traverses the prescribed path 106.

Further, the rectenna elements 204 can have both a posture and a position with respect to either or both the wireless power transmitter 102 and the prescribed path 106. For example, the rectenna elements 204 can be tilted by 20° with respect to the wireless power transmitter 102 as the wireless power receiver 202 traverses the prescribed path 106. In physically steering the rectenna elements 204, either or both a posture and a position of the rectenna elements 204 with respect to either or both the wireless power transmitter 102 and the prescribed path 106 can be physically changed. More specifically, in physically steering the rectenna elements 204, either or both a posture and a position of the rectenna elements 204 with respect to the wireless power transmitter 102 can be changed to ultimately change an amount of power that is received at the wireless power receiver 202 from incident power transmitted by the wireless power transmitter 102. For example, a mechanical displacement mechanism of the rectenna elements 204 can be controlled to tilt an antenna of the rectenna elements 204 towards the wireless power transmitter 102, e.g. changing a posture of the rectenna elements 204 with respect to the wireless power transmitter 102.

The rectenna elements 204 can be physically steered without changing a posture of the wireless power receiver 202 with respect to either or both the wireless power transmitter 102 and the prescribed path 106. Specifically, the rectenna elements 204 can be physically steered without changing a posture of the wireless power receiver 202 with respect to the wireless power transmitter 102 to change an amount of power received at the wireless power receiver 202 from incident power transmitted by the wireless power transmitter 102. More specifically, the rectenna elements 204 can be physically steered without changing a posture of the wireless power receiver 202 with respect to the wireless power transmitter 102 as the wireless power receiver traverses the prescribed path 106 to change an amount of power received at the wireless power receiver 202. For example, the wireless power receiver 202 can remain tilted away from the wireless power transmitter 102 as the wireless power receiver 202 traverses the prescribed path 106, e.g. a posture of the wireless power receiver 202 can remain unchanged as the wireless power receiver 202 traverses the prescribed path 106. Further in the example, the rectenna elements 204 can be physically steered to tilt one or more antennas of the rectenna elements 204 towards the wireless power transmitter 102 while the wireless power receiver 202, itself, remains titled away from the wireless power transmitter 102. In turn, this can change an amount of power, e.g. increase an amount of power, received at the wireless power receiver 202 from incident power transmitted by the wireless power transmitter 102.

Further, the rectenna elements 204 can remain physically stationary while either or both a position and a posture of the wireless power receiver 202 changes. As the rectenna elements 204 are included as part of the wireless power receiver 202, either or both a posture and a position of the rectenna elements 204 can change as the position and/or posture of the wireless power receiver 202 change. This can effectively physically steer the rectenna elements 204 while the rectenna elements remain physically stationary. In turn, an amount of power received at the wireless power receiver 202 can be changed by varying either or both a posture and a position of the wireless power receiver 202 while the rectenna elements 204 remain physically stationary.

In controlling the rectenna elements 204, a gain pattern of the rectenna elements 204 can be changed. Specifically, a gain pattern of the rectenna elements 204 can be varied to change an amount of power received at the wireless power receiver 202 from incident power transmitted by the wireless power transmitter 102. More specifically, a gain pattern of the rectenna elements 204 can be varied to change an amount of power received at the wireless power receiver 202 as the wireless power receiver traverses the prescribed path 106. For example, if a gain pattern of the rectenna elements 204 begins to switch away from a fan-shaped gain pattern along a plane defined by the wireless power transmitter 102 and at least a portion of the prescribed path 106, then the rectenna elements 204 can be adjusted to maintain the fan-shaped gain pattern as the wireless power receiver 202 traverses the prescribed path 106. Further, in the example, the rectenna elements 204 can be adjusted to maintain the fan-shaped gain pattern by adjusting electrical parameters of the rectenna elements 204. By adjusting the rectenna elements 204 to maintain the fan-shaped gain pattern, an amount of power received at the wireless power receiver 202 from incident power transmitted by the wireless power transmitter 102 can change as the wireless power receiver traverses the prescribed path 106.

Further, in controlling the rectenna elements 204, an orientation of a gain pattern of the rectenna elements 204 can be changed. Specifically, an orientation of a gain pattern of the rectenna elements 204 can be varied to change an amount of power received at the wireless power receiver 202 from incident power transmitted by the wireless power transmitter 102. More specifically, an orientation of a gain pattern of the rectenna elements 204 can be varied to change an amount of power received at the wireless power receiver 202 as the wireless power receiver traverses the prescribed path 106. For example, a displacement mechanism of the rectenna elements 204 can be controlled to change an orientation of a gain pattern of the rectenna elements 204 as the wireless power receiver traverses the prescribed path 106. In turn, changing the orientation of the gain pattern of the rectenna elements 204 can change an amount of power received at the wireless power receiver 202 from incident power transmitted by the wireless power transmitter 102 as the wireless power receiver traverses the prescribed path 106.

The rectenna elements 204 can be controlled to change an orientation of a gain pattern of the rectenna elements 204 while the gain pattern itself remains unchanged. Specifically, an orientation of a gain pattern of the rectenna elements 204 can be varied while the gain pattern remains static to change an amount of power received at the wireless power receiver 202 from incident power transmitted by the wireless power transmitter 102. More specifically, an orientation of a gain pattern of the rectenna elements 204 can be varied while the gain pattern remains static to change an amount of power received at the wireless power receiver 202 as the wireless power receiver traverses the prescribed path 106. For example, a gain pattern of the rectenna elements 204 can be kept as a fan-shaped gain pattern and the rectenna elements 204 can be controlled to tilt the fan-shaped gain pattern towards a plane defined by wireless power transmitter 102 and the prescribed path 106 as the wireless power receiver 202 traverses the prescribed path. In turn, this can change an amount of power received at the wireless power receiver 202 from incident power transmitted by the wireless transmitter 102 as the wireless power receiver traverses the prescribed path 106.

In various embodiments, the rectenna elements 204 include a plurality of rectenna elements in an array of rectenna elements. The array of rectenna elements can be controlled to change an amount of power received by the wireless power receiver 202 from incident power transmitted by the wireless power transmitter 102 as the wireless power receiver 202 traverses the prescribed path 106. Specifically, the array of rectenna elements can be controlled to change an amount of power received by the wireless power receiver 202 as either or both a position and a posture of the wireless power receiver 202 with respect to the wireless power transmitter 102 changes as the wireless power receiver 202 traverses the prescribed path 106. In controlling the array of rectenna elements, individual rectenna elements in the array of rectenna elements can be controlled independently from each other. Alternatively, in controlling the array of rectenna elements, the plurality of rectenna elements can be controlled in unison.

A plurality of rectenna elements in an array of rectenna elements of the rectenna elements 204 can be controlled by physically steering the rectenna elements in the array of rectenna elements. For example, rectenna displacement mechanisms can be controlled to change either or both a position and a posture of the plurality of rectenna elements in the array of rectenna elements as part of physically steering the plurality of rectenna elements in the array of rectenna elements. Further, the plurality of rectenna elements in the array of rectenna elements can be controlled by electrically steering the plurality of rectenna elements. For example, the array of rectenna elements can be a phased array of rectenna elements. Further in the example, phases of antennas of the plurality of rectenna elements in the phased array of rectenna elements can be adjusted to electrically steer the plurality of rectenna element in the phased array of rectenna elements.

In certain embodiments, the rectenna elements 204 can be formed by a single high-gain antenna and a single rectifier. A high-gain antenna can include a directional antenna with a focused narrow beam width.

A high-gain antenna of the rectenna elements 204 can be formed by a single antenna. The single antenna forming the high-gain antenna can be physically steerable to, e.g. as part of controlling the rectenna elements 204, to change the amount of power received at the wireless power receiver 202 from incident power transmitted by the wireless power transmitter as the wireless power receiver 202 traverses the prescribed path 106. Specifically, the single antenna forming the high-gain antenna can be physically steerable to change the amount of power received at the wireless power receiver 202 as either or both a position and a posture of the wireless power receiver 202 change as the wireless power receiver 202 traverses the prescribed path 106.

Further, a high-gain antenna of the rectenna elements 204 can be formed by a phased array of antennas. The phased array of antennas forming the high-gain antenna can be electrically steerable to, e.g. as part of controlling the rectenna elements 204, to change the amount of power received at the wireless power receiver 202 from incident power transmitted by the wireless power transmitter as the wireless power receiver 202 traverses the prescribed path 106. Specifically, the phased array of antennas forming the high-gain antenna can be electrically steerable to change the amount of power received at the wireless power receiver 202 as either or both a position and a posture of the wireless power receiver 202 change as the wireless power receiver 202 traverses the prescribed path 106.

In various embodiments, the rectenna elements 204 can be formed by a plurality of low-gain antennas and a plurality of rectifiers. A low-gain antenna can include an omnidirectional antenna with a broad beam width.

As discussed previously, the wireless power receiver 202 can be integrated as part of a flying apparatus, e.g. a drone. The flying apparatus can include one or more wings used to control flight of the apparatus. The rectenna elements 204 can be disposed on the one or more wings of the flying apparatus. This can help ensure that the rectenna elements 204 receive incident power transmitted by the wireless power transmitter 102. Further, the flying apparatus can include one or more rotors that are used to drive flight of the flying apparatus. The rectenna elements 204 can be shaped to fit around at least a portion of the one or more rotors. Specifically, the rectenna elements 204 can be shaped as a cage to fit around at least a portion of the one or more rotors. This can reduce overall drag of the flying apparatus while ensuring that rectenna elements 204 receive incident power transmitted by the wireless power transmitter 102.

Figure 3:
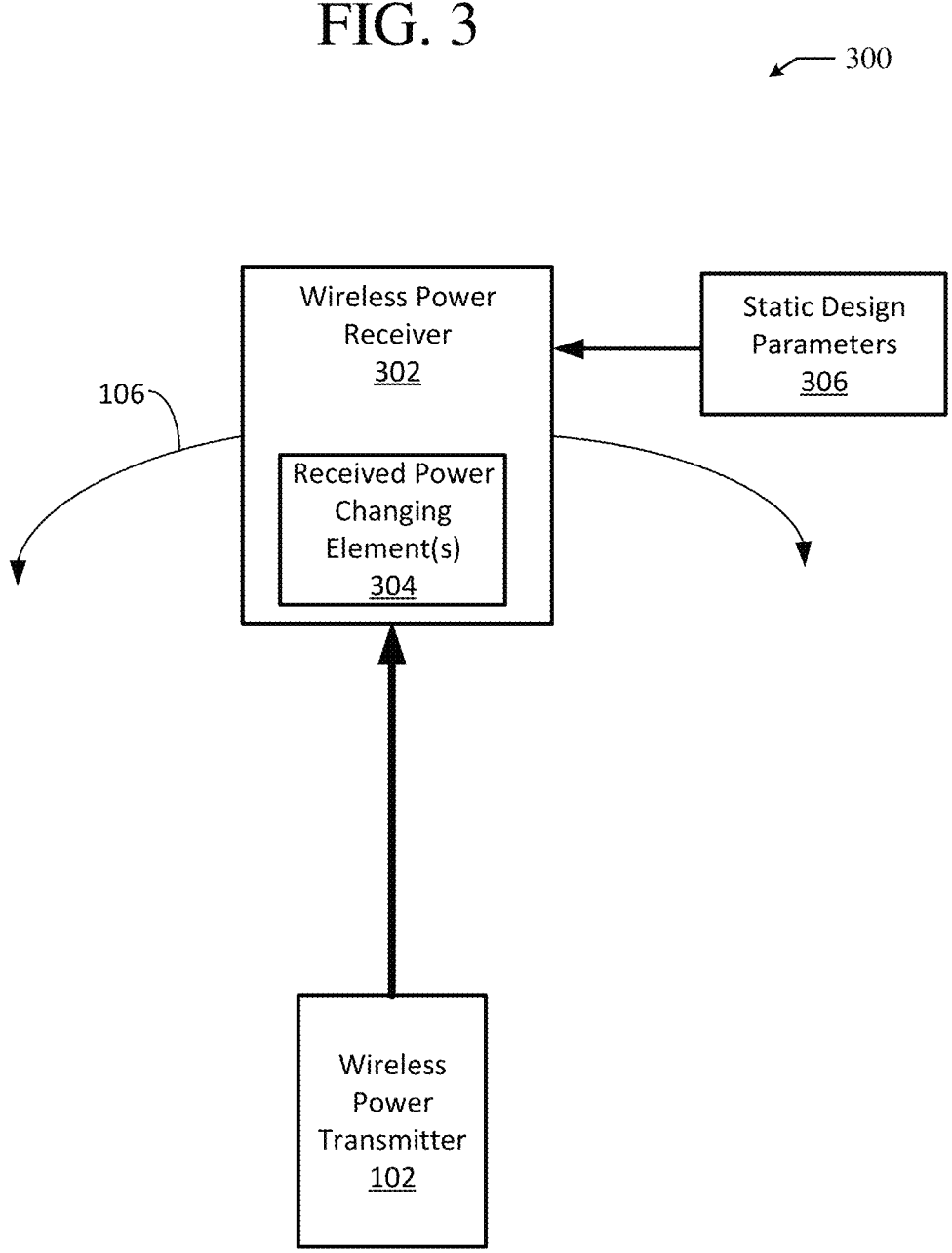
FIG. 3 illustrates an example system for delivering and receiving wireless power to change an amount of wireless power received from incident power based on static design parameters of a wireless power receiver.

FIG. 3 illustrates an example system 300 for delivering and receiving wireless power to change an amount of wireless power received from incident power based on static design parameters of a wireless power receiver. The example system 300 shown in FIG. 3 includes a wireless power receiver 302 and the wireless power transmitter 102. The wireless power receiver 302 can receive power wirelessly from incident wireless power transmitted by the wireless power transmitter 102. More specifically, the wireless power receiver 302 can receive power from incident wireless power transmitted by the wireless power transmitter 102 as the wireless power receiver 202 traverses the prescribed path 106.

As discussed with the previously described wireless power receivers, the wireless power receiver 302 can move either or both terrestrially or aerially as it traverses the prescribed path 106. For example, the wireless power receiver 302 can be integrated as part of an aerial drone. In another example, the wireless power receiver 302 can be integrated as part of a terrestrial vehicle.

The wireless power receiver 302 includes one or more received power changing elements 304. The one or more received power changing elements 304 can function according to the previously described received power changing elements, e.g. received power changing elements 108, to change an amount of power received at the wireless power receiver 302 as the wireless power receiver 302 traverses the prescribed path 106. For example, the received power changing elements 304 can change either or both a position and a posture of the wireless power receiver 302 to change as the wireless power receiver 302 traverses the prescribed path 106. In turn, this can change an amount of power that is received at the wireless power receiver 302 from incident power transmitted by the wireless power transmitter 102 as the wireless power receiver 302 traverses the prescribed path 106.

The received power changing elements 304 can include one or more rectenna elements, such as the rectenna elements 204. As discussed previously with respect to the rectenna elements 204, the rectenna elements of the received power changing elements 304 can be physically steered to change the amount of power received at the wireless power receiver 302. Further, as discussed previously with respect to the rectenna elements 204, the rectenna elements of the received power changing elements 304 can be electrically steered to change the amount of power received at the wireless power receiver 302.

The received power changing elements 304 can include static elements. As discussed previously, static elements can include elements of the wireless power receiver 302 or an apparatus integrating the wireless power receiver 302 that are uncontrollable during operation of the wireless power receiver 302. Specifically, static elements of the received power changing elements 304 can include elements having either or both physical and electrical characteristics that remain unchanged during the operation of the wireless power receiver 302. For example, a static element can include mounting surface of the wireless power receiver 302 or corresponding apparatus that are used to mount other received power changing elements, e.g. rectenna elements. Further, static elements can include mounts and corresponding mounting positions that are used to mount other received power changing elements, e.g. rectenna elements, to a mounting surface.

The wireless power receiver 302 can be manufactured according to static design parameters 306. The static design parameters 306 include design parameters that control actual manufacture of the wireless power receiver 302 and/or an apparatus integrating the wireless power receiver 302. For example, the static design parameters 306 can specify a shape of the wireless power receiver 302.

The static design parameters 306 can include design parameters for controllable elements of the wireless power receiver 302. Specifically, the static design parameters 306 can include design parameters of elements controllable to change an amount of power received at the wireless power receiver 302 as the wireless power receiver 302 traverses the prescribed path 106. For example, the static design parameters 306 can include a type and a number of rectenna elements to integrate with or otherwise include as part of the wireless power receiver 302. In another example, the static design parameters 306 can include characteristics of one or more rectenna elements of the wireless power receiver 302 to form a specific gain pattern for the wireless power receiver 302.

Additionally, the static design parameters 306 can include design parameters for static elements of the wireless power receiver 302 and be selected for the static elements of the wireless power receiver 302. Specifically, design parameters of the static elements of the wireless power receiver 302 can be selected based on the prescribed path 106 to change the amount of power received at the wireless power receiver 302. For example, if the prescribed path 106 is a curved path, then a curved housing of the wireless power receiver 302, as part of a static design parameter 306 of a static element of the wireless power receiver 302, can be selected. In turn, this can change the amount of power received at the wireless power receiver 302 during traversal of the prescribed path 106.

The static design parameters 306 can be selected to change an amount of power received at the wireless power receiver 302 from incident power transmitted by the wireless power transmitter 102. Specifically, the static design parameters 306 can be selected based on the prescribed path 106 to change the amount of power received at the wireless power receiver 302 as the wireless power receiver traverses the prescribed path 106. More specifically, the static design parameters 306 can be selected to change the amount of power received at the wireless power receiver 302 as either or both a position and posture of the wireless power receiver 302, with respect to the wireless power transmitter 102, change. For example, if the prescribed path 106 is a curved path, then a curved housing shape of the wireless power receiver 302, e.g. the static design parameters 306, can be selected. Specifically, based on the fact that the prescribed path 106 is curved, the curved housing shape can be selected to change the amount of power received at the wireless power receiver 302 during traversal of the prescribed path 106.

The static design parameters 306 can include a shape of one or more mounting surfaces upon which one or more rectenna elements are disposed for the wireless power receiver 302. Specifically, the shape of one or more mounting surfaces upon which one or more rectenna elements are mounted can be selected based on the prescribed path 106 to change the amount of power received at the wireless power receiver 302. For example, if the prescribed path 106 is a curved path, then a concave mounting surface, with respect to the wireless power transmitter 102, can be selected as part of the static design parameters 306. In turn, this can change the amount of power received at the wireless power receiver 302 during traversal of the prescribed path 106.

Further, the static design parameters 306 can include positions at which one or more rectenna elements are disposed on mounting surfaces for the wireless power receiver 302. Specifically, the positions at which the one or more rectenna elements are disposed on the mounting surface can be selected based on the prescribed path 106 to change the amount of power received at the wireless power receiver 302. For example, if the prescribed path 106 is a straight path, then mounting positions for rectenna elements on the bottom of the wireless power receiver 302 can be selected as part of the static design parameters 306. In turn, this can change the amount of power received at the wireless power receiver 302 during traversal of the prescribed path 106.

The static design parameters 308 can be selected based on characteristics of an apparatus that includes or incorporates the wireless power receiver 302. Specifically, the static design parameters 308 can be selected based on either or both the prescribed path 106 and the characteristics of the apparatus to change the amount of power received at the wireless power receiver 302. Characteristics of the apparatus can include both physical and electrical characteristics of the apparatus. For example, if an apparatus incorporating the wireless power receiver 302 is a flying drone with a nose and a tail, then characteristics of the drone/apparatus can include the dimensions of the nose and the tail. Further, static parameters of rectenna elements of the wireless power receiver 302 can be selected to create a gain pattern with a high gain towards the nose and the tail of the drone based on the dimensions of the nose and the tail, as indicated by characteristics of the drone.

Further, the static design parameters 306 can be selected to change an amount of power received at the wireless power receiver 302 with respect to one or more specific amounts of power. Specifically, the static design parameters 306 of the wireless power receiver 302 can be selected to maintain an amount of power received at the wireless power receiver 302 above a specific threshold amount of power, as the wireless power receiver 302 traverses the prescribed path 106. Alternatively, the static design parameters 306 of the wireless power receiver 302 can be selected to maintain an amount of power received at the wireless power receiver 302 within a specific range of amounts of power, as the wireless power receiver 302 traverses the prescribed path.

Additionally, the static design parameters 306 can be selected based on an identified target effective aperture for the wireless power receiver 302. Specifically, the static design parameters 306 can be selected based on an identified target effective aperture of the wireless power receiver 302 with respect to the wireless power transmitter 102 as the wireless power receiver 302 traverses at least a portion of the prescribed path 106.

FIG. 4 is a flowchart 400 of an example method of controlling elements of a wireless power receiver based on a prescribed path to change an amount of power received by the receiver during traversal of the prescribed path. The example method shown in FIG. 4 can be performed within an applicable wireless power delivery and receipt system, such as the example systems 100, 200, and 300 shown in FIGS. 1-3.

At step 402, a prescribed path that a moving wireless power receiver traverses is identified. The prescribed path can include a predefined route that the wireless power receiver traverses. Further, the prescribed path can be identified by the wireless power receiver or another applicable system or device in a wireless power delivery and receipt system, such as a wireless power transmitter. As the wireless power receiver traverses the prescribed path either or both a position and a posture of the wireless power receiver can change with respect to either or both the prescribed path and one or more wireless power transmitters.

At step 404, at least one element of the wireless power receiver is controlled based on the prescribed path to change an amount of power received at the wireless power receiver from incident power transmitted by one or more wireless power transmitters. Specifically, at least one element of the wireless power receiver can be controlled to change the amount of power received at the wireless power receiver from incident power as either or both a posture and a position of the wireless power receiver with respect to the one or more wireless power transmitters changes. More specifically, the at least one element can be controlled to change the amount of power received at the wireless power receiver as either or both the posture and the position of the wireless power receiver change during traversal of the prescribed path.

The at least one element of the wireless power receiver controlled, at step 404, to change the amount of power received at the wireless power receiver can include the received power changing elements 108. For example, the at least one element can include tilt control mechanisms to control a tilt of the wireless power receiver with respect to the one or more wireless power transmitters. Further, the at least one element of the wireless power receiver controlled, at step 404, to change the amount of power received at the wireless power receiver can include the rectenna elements 204, e.g. as part of the received power changing elements 108. For example, one or more rectenna elements of the wireless power receiver can be physically steered to change the amount of power received at the wireless power receiver during traversal of the prescribed path.

FIG. 5 is a flowchart 500 of an example method of manufacturing a wireless power receiver based on a prescribed path to change an amount of power received by the receiver during traversal of the prescribed path. The example method shown in FIG. 5 can be performed within an applicable wireless power delivery and receipt system, such as the example systems 100, 200, and 300 shown in FIGS. 1-3.

At step 502, a prescribed path that a moving wireless power receiver traverses is identified. The prescribed path can include a predefined route that the wireless power receiver traverses. The prescribed path can be identified by a manufacturer of the wireless power receiver. For example, the prescribed path can be identified by the manufacturer based on an application of the wireless power receiver. As the wireless power receiver traverses the prescribed path either or both a position and a posture of the wireless power receiver can change with respect to either or both the prescribed path and one or more wireless power transmitters.

At step 504, one or more static design parameters of the wireless power receiver are selected based on the prescribed path to change an amount of power received at the wireless power receiver from incident power transmitted by one or more wireless power transmitters. Specifically, the one or more static design parameters of the wireless power receiver can be selected to change the amount of power received at the wireless power receiver from incident power as either or both a posture and a position of the wireless power receiver with respect to the one or more wireless power transmitters changes. More specifically, the one or more static design parameters can be selected to change the amount of power received at the wireless power receiver as either or both the posture and the position of the wireless power receiver change during traversal of the prescribed path.

The one or more static design parameters of the wireless power receiver can include the static design parameters 306 discussed with respect to FIG. 3. Specifically, the one or more static design parameters can include design parameters of static elements of the wireless power receiver. Additionally, the one or more static design parameters can include static design parameters of controllable elements of the wireless power receiver. The one or more static design parameters can be selected, e.g. based on the prescribed path, by the manufacturer of the wireless power receiver. Alternatively, the one or more static design parameters can be selected, e.g. based on the prescribed path, by a customer requesting the wireless power receiver.

FIG. 6 is a flowchart 600 of an example method of controlling elements of a wireless power receiver based on a prescribed path and a position of the receiver in the prescribed path to change an amount of power received by the receiver during traversal of the prescribed path. The example method shown in FIG. 6 can be performed within an applicable wireless power delivery and receipt system, such as the example systems 100, 200, and 300 shown in FIGS. 1-3.

At step 602, a prescribed path that a moving wireless power receiver traverses is identified. The prescribed path can include a predefined route that the wireless power receiver traverses. Further, the prescribed path can be identified by the wireless power receiver or another applicable system or device in a wireless power delivery and receipt system, such as a wireless power transmitter. As the wireless power receiver traverses the prescribed path either or both a position and a posture of the wireless power receiver can change with respect to either or both the prescribed path and one or more wireless power transmitters.

At step 604, a position of the wireless power receiver in the prescribed path is identified as the wireless power receiver traverses the prescribed path. The position of the wireless power receiver in the prescribed path can be identified by the wireless power receiver or another applicable system or device in a wireless power delivery and receipt system. For example, the position of the wireless power receiver in the prescribed path can be identified by one or more wireless power transmitters transmitting power of a wireless power delivery and receipt system. In another example, the position of the wireless power receiver in the prescribed path can be identified by a central control hub of a wireless power delivery and receipt system.

The position of the wireless power receiver in the prescribed path can be identified based on a direction of one or more beams of incident power transmitted by the one or more wireless power transmitters. Specifically, the position of the wireless power receiver can be identified based on a direction of one or more beams of incident power at the wireless power receiver as the wireless power receiver traverses the prescribed path. For example, the wireless power receiver can be configured to follow one or more beams of power as it traverses the prescribed path. Accordingly, the directions of the one or more beams of power can be used to identify the position of the wireless power receiver in the prescribed path as it traverses the prescribed path. In another example, one or more beams of power can be transmitted to follow the position of the wireless power receiver in the prescribed path as the wireless power receiver traverses the prescribed path. Accordingly, the directions of the one or more beams of power can used to identify the position of the wireless power receiver in the prescribed path as it traverses the prescribed path.

Further, the position of the wireless power receiver in the prescribed path can be identified based on communications between the wireless power receiver and the one or more wireless power transmitters. Specifically, the wireless power receiver can determine its own position using an applicable mechanism, e.g. through GPS. Subsequently, the wireless power receiver can communicate its identified position to the one or more wireless power transmitters. Alternatively, the one or more wireless power transmitters can use an applicable tracking mechanism to track a position of the wireless power receiver in the prescribed path, e.g. using received backscattered power from the wireless power receiver. Subsequently, the one or more one or more wireless power transmitters can communicate the determined position of the wireless power receiver to the wireless power receiver.

At step 606, at least one element of the wireless power receiver is controlled based on the prescribed path and the position of the wireless power receiver in the prescribed path to change an amount of power received at the wireless power receiver from incident power transmitted by one or more wireless power transmitters. Specifically, at least one element of the wireless power receiver can be controlled based on the prescribed path and the position of the wireless power receiver in the prescribed path to change the amount of power received at the wireless power receiver from incident power as either or both a posture and a position of the wireless power receiver with respect to the one or more wireless power transmitters changes. More specifically, the at least one element can be controlled based on the prescribed path and the position of the wireless power receiver in the prescribed path to change the amount of power received at the wireless power receiver as either or both the posture and the position of the wireless power receiver change during traversal of the prescribed path.

The at least one element of the wireless power receiver controlled, at step 606, to change the amount of power received at the wireless power receiver can include the received power changing elements 108. For example, the at least one element can include tilt control mechanisms to control a tilt of the wireless power receiver with respect to the one or more wireless power transmitters. Further in the example, if it is identified that the wireless power receiver will tilt 30° at a specific position in the prescribed path, then the tilt control mechanisms can be activated to counteract the tilt when the wireless power receiver is as the position in the prescribed path. Further, the at least one element of the wireless power receiver controlled, at step 606, to change the amount of power received at the wireless power receiver can include the rectenna elements 204, e.g. as part of the received power changing elements 108. For example, one or more rectenna elements of the wireless power receiver can be physically steered to change the amount of power received at the wireless power receiver during traversal of the prescribed path based on the position of the wireless power receiver in the prescribed path.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

What is claimed is:

1. A method comprising:
   identifying a prescribed path that a moving wireless power receiver traverses and
   controlling at least one element of the wireless power receiver based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
   wherein the at least one element includes one or more rectenna elements of the wireless power receiver and
   wherein the one or more rectenna elements are controlled by electrically steering the one or more rectenna elements to change the amount of power received at the wireless power receiver from the incident power transmitted by the one or more wireless power transmitters as the wireless power receiver traverses the prescribed path.

2. The method of claim 1, wherein the amount of power received at the wireless power receiver from the incident power is changed to maintain the amount of power received at the wireless power receiver above a specific threshold amount of power.

3. The method of claim 1, wherein the amount of power received at the wireless power receiver from the incident power is changed to maintain the amount of power received at the wireless power receiver within a specific range of amounts of power.

4. The method of claim 1, wherein the at least one element is controlled to change the posture of the wireless power receiver with respect to the one or more wireless power transmitters to change the amount of power received at the wireless power receiver from the incident power transmitted by the one or more wireless power transmitters as the wireless power receiver traverses the prescribed path.

5. The method of claim 1, wherein the one or more rectenna elements are formed by a single high-gain antenna and a single rectifier.

6. The method of claim 1, wherein the one or more rectenna elements are formed by a plurality of low-gain antennas and a plurality of rectifiers.

7. A method comprising:
   identifying a prescribed path that a moving wireless power receiver traverses and
   controlling at least one element of the wireless power receiver based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
   wherein the at least one element includes one or more rectenna elements of the wireless power receiver and
   wherein the one or more rectenna elements are controlled by physically steering the one or more rectenna elements to change the amount of power received at the wireless power receiver from the incident power transmitted by the one or more wireless power transmitters as the wireless power receiver traverses the prescribed path.

8. The method of claim 7, wherein the one or more rectenna elements are physically steered without changing the posture of the wireless power receiver.

9. The method of claim 7, wherein the one or more rectenna elements are physically steered by physically changing the posture of the wireless power receiver.

10. The method of claim 7, wherein the at least one element includes a plurality of rectenna elements in an array of rectenna elements.

11. The method of claim 10, wherein the array of rectenna elements is controlled by physically steering the plurality of rectenna elements to change the amount of power received at the wireless power receiver from the incident power transmitted by the one or more wireless power transmitters as the wireless power receiver traverses the prescribed path.

12. The method of claim 10, wherein the array of rectenna elements is a phased array that is controlled by electrically steering the plurality of rectenna elements to change the amount of power received at the wireless power receiver from the incident power transmitted by the one or more wireless power transmitters as the wireless power receiver traverses the prescribed path.

13. A method comprising:
    identifying a prescribed path that a moving wireless power receiver traverses and
    controlling at least one element of the wireless power receiver based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
    wherein the at least one element includes one or more rectenna elements of the wireless power receiver and
    wherein the one or more rectenna elements are controlled by changing a gain pattern of the one or more rectenna elements to change the amount of power received at the wireless power receiver from the incident power transmitted by the one or more wireless power transmitters as the wireless power receiver traverses the prescribed path.

14. A method comprising:
    identifying a prescribed path that a moving wireless power receiver traverses and
    controlling at least one element of the wireless power receiver based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
    wherein the at least one element includes one or more rectenna elements of the wireless power receiver and
    wherein the at least one element of the wireless power receiver is controlled to change an orientation of a gain pattern of the one or more rectenna elements to change the amount of power received at the wireless power receiver from the incident power transmitted by the one or more wireless power transmitters as the wireless power receiver traverses the prescribed path.

15. The method of claim 14, wherein the gain pattern remains unchanged as the orientation of the gain pattern of the one or more rectenna elements is changed by controlling the at least one element of the wireless powerl receiver.

16. A method comprising:
  identifying a prescribed path that a moving wireless power receiver traverses and
  controlling at least one element of the wireless power receiver based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
  wherein the wireless power receiver is manufactured according to one or more static design parameters and the one or more static design parameters are selected based on the prescribed path to further change the amount of power received at the wireless power receiver from the incident power transmitted by the one or more wireless power transmitters as either or both the posture and the position of the wireless power receiver change with respect to the one or more wireless power transmitters as the wireless power receiver traverses the prescribed path.

17. The method of claim 16, wherein the one or more static design parameters of the wireless power receiver include a shape of one or more mounting surfaces upon which one or more rectenna elements are disposed.

18. The method of claim 16, wherein the one or more static design parameters includes positions at which one or more rectenna elements are disposed on one or more mounting surfaces of the wireless power receiver.

19. The method of claim 16, wherein the one or more static design parameters include one or more design parameters of one or more static elements of the wireless power receiver.

20. A method comprising:
  identifying a prescribed path that a moving wireless power receiver traverses;
  controlling at least one element of the wireless power receiver based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path;
  identifying a target effective aperture for the wireless power receiver with respect to the one or more wireless power transmitters as the wireless power receiver traverses at least a portion of the prescribed path; and
  controlling the at least one element of the wireless power receiver based on the prescribed path to achieve the target effective aperture at the wireless power receiver by changing the amount of power received at the wireless power receiver from the incident power transmitted by the one or more wireless power transmitters as the wireless power receiver traverses the at least the portion of the prescribed path.

21. A wireless power receiver for movement along a prescribed path comprising:
  at least one element controllable based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
  wherein the at least one element includes one or more rectenna elements of the wireless power receiver and
  wherein the one or more rectenna elements are controllable by electrical steering the one or more rectenna elements to change the amount of power received at the wireless power receiver from the incident power transmitted by the one or more wireless power transmitters as the wireless power receiver traverses the prescribed path.

22. The wireless power receiver of claim 21, wherein the amount of power received at the wireless power receiver from the incident power is changed to maintain the amount of power received at the wireless power receiver above a specific threshold amount of power.

23. The wireless power receiver of claim 22, wherein the amount of power received at the wireless power receiver from the incident power is changed to maintain the amount of power received at the wireless power receiver within a specific range of amounts of power.

24. The wireless power receiver of claim 23, wherein the at least one element is controllable to change the posture of the wireless power receiver with respect to the one or more wireless power transmitters to change the amount of power received at the wireless power receiver from the incident power transmitted by the one or more wireless power transmitters as the wireless power receiver traverses the prescribed path.

25. The wireless power receiver of claim 21, wherein the one or more rectenna elements are formed by a single high-gain antenna and a single rectifier.

26. The wireless power receiver of claim 21, wherein the one or more rectenna elements are formed by a plurality of low-gain antennas and a plurality of rectifiers.

27. A wireless power receiver for movement along a prescribed path comprising:
  at least one element controllable based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
  wherein the at least one element includes one or more rectenna elements of the wireless power receiver and
  wherein the one or more rectenna elements are controllable by physically steering the one or more rectenna elements to change the amount of power received at the wireless power receiver from the incident power transmitted by the one or more wireless power transmitters as the wireless power receiver traverses the prescribed path.

28. The wireless power receiver of claim 27, wherein the one or more rectenna elements are physically steerable without changing the posture of the wireless power receiver.

29. The wireless power receiver of claim 27, wherein the one or more rectenna elements are physically steerable by physically changing the posture of the wireless power receiver.

30. The wireless power receiver of claim 27, wherein the at least one element includes a plurality of rectenna elements in an array of rectenna elements.

31. The wireless power receiver of claim 30, wherein the array of rectenna elements is controllable by physically steering the plurality of rectenna elements to change the amount of power received at the wireless power receiver from the incident power transmitted by the one or more wireless power transmitters as the wireless power receiver traverses the prescribed path.

32. The wireless power receiver of claim 30, wherein the array of rectenna elements is a phased array that is controllable by electrically steering the plurality of rectenna elements to change the amount of power received at the wireless power receiver from the incident power transmitted by the one or more wireless power transmitters as the wireless power receiver traverses the prescribed path.

33. A wireless power receiver for movement along a prescribed path comprising:
at least one element controllable based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
wherein the at least one element includes one or more rectenna elements of the wireless power receiver and
wherein the one or more rectenna elements are controllable by changing a gain pattern of the one or more rectenna elements to change the amount of power received at the wireless power receiver from the incident power transmitted by the one or more wireless power transmitters as the wireless power receiver traverses the prescribed path.

34. A wireless power receiver for movement along a prescribed path comprising:
at least one element controllable based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
wherein the at least one element includes one or more rectenna elements of the wireless power receiver and
wherein the at least one element of the wireless power receiver is controllable to change an orientation of a gain pattern of the one or more rectenna elements to change the amount of power received at the wireless power receiver from the incident power transmitted by the one or more wireless power transmitters as the wireless power receiver traverses the prescribed path.

35. The wireless power receiver of claim 34, wherein the at least one element of the wireless power receiver is further controllable to change the orientation of the gain pattern of the one or more rectenna elements while the gain pattern remains unchanged.

36. A wireless power receiver for movement along a prescribed path comprising:
at least one element controllable based on the prescribed path to change an amount of power received at the wireless power receiver from incident power transmitted by one or more wireless power transmitters as either or both a posture and a position of the wireless power receiver change with respect to the one or more wireless power transmitters as the wireless power receiver traverses the prescribed path,
wherein the wireless power receiver is manufactured according to one or more static design parameters and the one or more static design parameters are selected based on the prescribed path to further change the amount of power received at the wireless power receiver from the incident power transmitted by the one or more wireless power transmitters as either or both the posture and the position of the wireless power receiver change with respect to the one or more wireless power transmitters as the wireless power receiver traverses the prescribed path.

37. The wireless power receiver of claim 36, wherein the one or more static design parameters of the wireless power receiver include a shape of one or more mounting surfaces upon which one or more rectenna elements are disposed.

38. The wireless power receiver of claim 36, wherein the one or more static design parameters includes positions at which one or more rectenna elements are disposed on one or more mounting surfaces of the wireless power receiver.

39. The wireless power receiver of claim 36, wherein the one or more static design parameters include one or more design parameters of one or more static elements of the wireless power receiver.

* * * * *